United States Patent
Fracchioni et al.

[11] 3,893,347
[45] July 8, 1975

[54] CHANGE SPEED TRANSMISSIONS AND CONTROLS THEREFOR

[75] Inventors: Bruno Fracchioni, Rome; Guglielmo Villani, Lavinio, both of Italy

[73] Assignee: Massey-Ferguson Services N.V., Curacao, Netherlands

[22] Filed: June 25, 1973

[21] Appl. No.: 373,537

[52] U.S. Cl. ............ 74/473 R; 74/57; 74/143; 74/158; 74/337.5; 214/138 R
[51] Int. Cl. ............ G05g 9/02; F16h 5/08
[58] Field of Search ........... 74/57, 142, 143, 473 R, 74/337.5, 158; 214/138 R

[56] References Cited
UNITED STATES PATENTS

| | | | |
|---|---|---|---|
| 851,842 | 4/1907 | Sears | 74/337.5 X |
| 905,637 | 12/1908 | Beskow | 74/337.5 X |
| 1,286,829 | 12/1918 | Strozier | 74/57 |
| 1,686,383 | 10/1928 | Klausmeyer | 74/57 X |
| 2,577,019 | 12/1951 | Kesterton | 74/473 |
| 3,053,041 | 9/1962 | Gryse et al. | 74/1.5 X |
| 3,370,477 | 2/1968 | Lewis | 74/337.5 |
| 3,487,713 | 1/1970 | Sturmer | 74/337.5 |
| 3,599,801 | 8/1971 | Roll et al. | 214/138 R X |
| 3,665,775 | 5/1972 | Freeman | 74/142 |

FOREIGN PATENTS OR APPLICATIONS

| | | | |
|---|---|---|---|
| 896,995 | 9/1958 | United Kingdom | 74/337.5 |
| 737,820 | 4/1953 | United Kingdom | 74/337.5 |
| 806,095 | 6/1951 | Germany | 74/337.5 |
| 848,610 | 9/1958 | United Kingdom | 74/337.5 |

*Primary Examiner*—Allan D. Herrmann
*Attorney, Agent, or Firm*—Thomas P. Lewandowski

[57] ABSTRACT

A gear lever arrangement for an excavator in which movement of the gear lever away from a neutral position causes rotation of shaft through 90°. Cam tracks on the shaft index a selector fork to change gear ratio, the gear lever then returns to the neutral position. Each alternative gear ratio is a neutral ratio.

4 Claims, 9 Drawing Figures

3,893,347

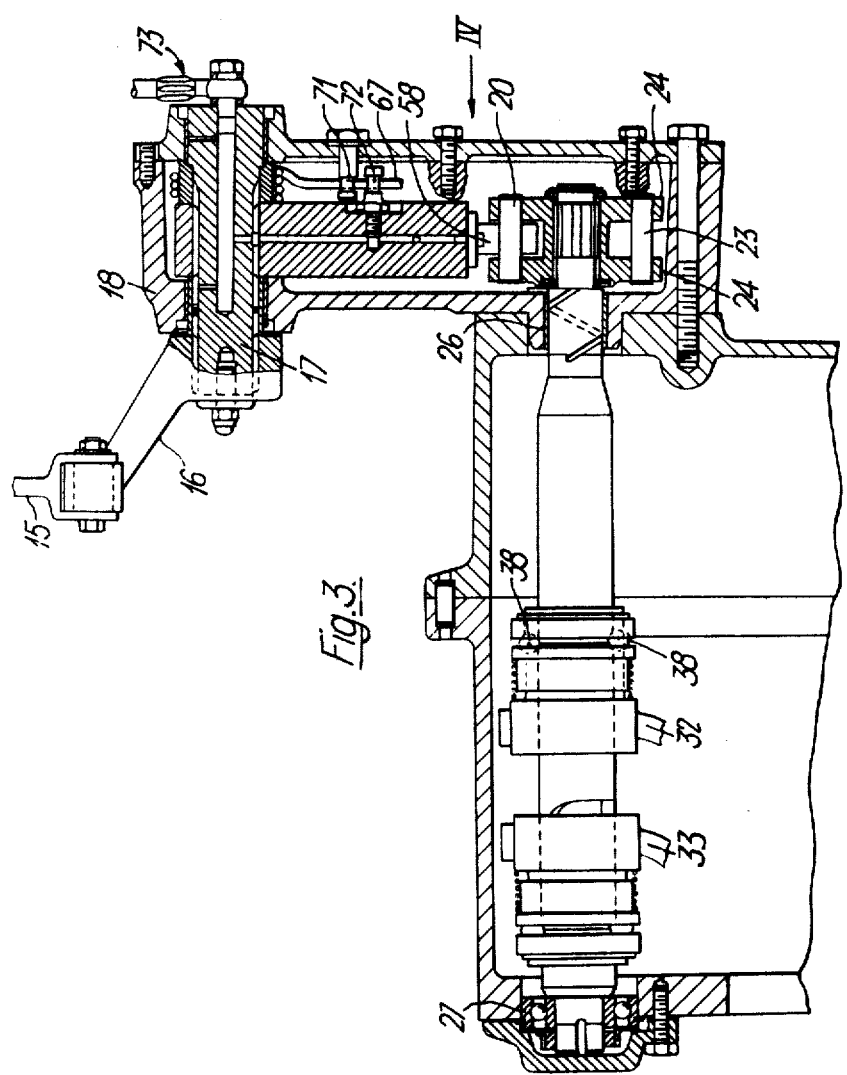

E = Engaged
N = Neutral

+ = Drive
0 = No drive

| Angular rotation from Datum A | Clutch 34 | Clutch 35 | Drive condition |
|---|---|---|---|
| 0° | E | E | + |
| 90° | E | N | 0 |
| 180° | E | E | + |
| 270° | N | N | 0 |
| 360° | E | E | + |
| 450° | E | N | 0 |
| 540° | E | E | + |

CHANGE SPEED TRANSMISSIONS AND CONTROLS THEREFOR

This invention relates to change speed transmissions and controls therefore.

On industrial vehicles, the operator of the vehicle may be called upon to operate a large number of controls at once in order to obtain maximum output of the vehicle. It is therefore undesirable that one particular control should require the operators full attention in order to operate it. A particular problem is found on 360° excavator in which the vehicle transmission is required intermittently. A conventional control for change speed transmissions requires the operator to observe the position of the gear selection lever, and to move it to the appropriate position on the 'gate' for the selected transmission ratio. The movement of the gear lever is usually in two or even three planes and so requires the operators attention. Thus the operator must observe the position of the gear lever and select a ratio in order to move the vehicle to a new operating position and upon reaching the new operating position must again observe the position of the gear lever to move it back to the neutral position to disengage the transmission.

The present invention obviates or mitigates the above disadvantages by providing a gear lever which moves in one plane only to change the transmission ratio and is biased to return to a preferred position. Thus the gear lever is always in the same position for the operator to find. Further, alternate ratios are neutral ratios and so if the transmission of the vehicle is engaged the operator has only to move the lever in the one plane and the transmission is disengaged. Similarly with the transmission disengaged an identical movement to that described above engages the transmission. Thus selection of an appropriate gear ratio requires a minimum of attention enabling the operator to concentrate on other aspects of the vehicles operation.

Preferably movement of the gear lever rotates a shaft which is provided with a cam track. The cam track engages a cam follower connected to a selector fork which selects the appropriate gear ratio.

An embodiment of the invention will now be described by way of example only, with reference to the accompanying drawings, in which:

FIG. 3 is a side view in section of the controls for the change speed transmission;

Figure 1:
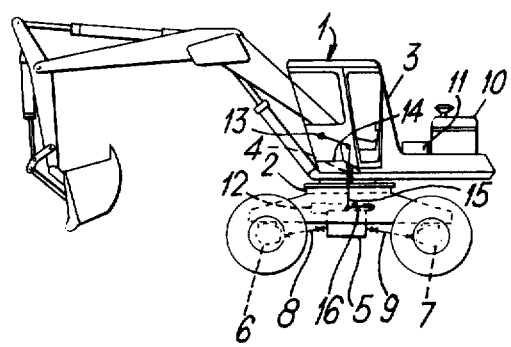
FIG. 1 is a side view of an excavator showing the general arrangement of the invention.
Figure 2:
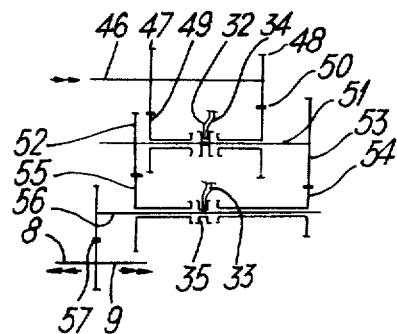
FIG. 2 is a schematic representation of the change speed transmission.
Figure 5:
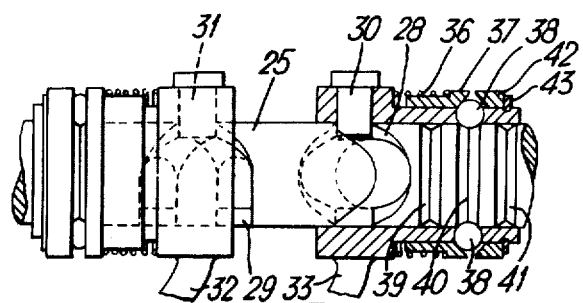
FIG. 5 is a side view, part in section, of the selector mechanism for the change speed transmission.

Referring to FIG. 1 an excavator 1 is provided with a chassis 2 and a superstructure 3. The superstructure 3 is rotatable through 360° about a pivot 4. The chassis 2 carries a change speed transmission 5 which in turn drives axles 6, 7, via drive shafts 8, 9. Each of the axles 6, 7 is provided with a pair of wheels to propel the excavator 1. An engine 10, carried by the superstructure 3, drives a fluid pump 11 which selectively supplies pressure fluid to a motor 12, the motor 12 driving the input shaft 46 of the transmission.

The transmission 5 is provided with a multiplicity of speed ratios, one of which may be selected at any time in a manner to be described.

A lever 13, which is moveable relative to the superstructure 3 in a substantially vertical plane, is pivotally connected to the superstructure 3, at 14. The lever 13 is ball-jointed to one end of a rod 15 in a manner that allows for free rotation of the lever 13 about rod 15 in a horizontal plane but which transmits any movement of lever 13 in a vertical plane to the rod 15. The rod 15 lies on the axis of rotation of the superstructure 3 about the chassis 2 and therefore does not interfere with rotation of the superstructure 3 about the chassis 2.

The other end of rod 15 is pivotally connected to a lever 16 which in turn is attached to a splined shaft 17. The shaft 17 is rotatable in a housing 18. An indexing mechanism 19, the operation of which will be described later, is fixed on the shaft 17 for rotation therewith.

Four pins 20, 21, 22, 23 are fixedly attached between spaced discs 24 which in turn are fixedly attached to a shaft 25. The shaft 25 is supported by bearings 26, 27 which allow the shaft to rotate but prevent axial movement of the shaft. The shaft 25 is provided with cam tracks 28, 29 which co-operate with drive means having cam followers 30, 31 a pair of selector forks 32, 33. The selector forks 32, 33 are of conventional design and co-operate with clutches 34, 35.

Unintentional axial movement of the selector forks 32, 33 from one of three preferred positions is prevented by a spring 36 urging a collar 37 in an axial direction and biasing a plurality of balls 38 into co-operation with one of three circumferential grooves 39, 40, 41 provided in the shaft 25. A second collar 42, retained on the selector fork 33 by a split ring 43 co-operates with the first collar 37 to limit the radial movement of the balls 38.

The change speed transmission 5 is provided with a gear train comprising a shaft 46 and gear wheels 47, 48 the gear train being driven by the pump 12. The gears 47, 48 are in constant mesh with gears 49, 50 respectively. Each of the gears 49, 50 are freely rotatable on the shaft 51 but may be coupled thereto by means of the axially moveable clutch 34 which is splined to the shaft 51 for rotation therewith. The clutch 34 may occupy one of three positions. In a central or neutral position neither of the gears 49 or 50 are coupled to the shaft 51. When the clutch 34 is moved axially towards the gear 50 then the gear 50 is coupled to the shaft 51 and transmits drive to the shaft 51 from the pump 12. Similarly when the clutch 34 is moved towards the gear 49 the gear 49 is coupled to the shaft 51. Fixedly attached to the shaft 51 are gears 52, 53 which are in constant mesh with gears 54, 55 respectively. A clutch 35 selectively couples the gears 54, 55 to the shaft 56 in a manner described above. The shaft 56 is connected via reduction gearing 57 to the drive shafts 8, 9 to provide drive to the axles 6, 7. Hence it will be seen with the aid of FIG. 8 that a total of seven speed ratios are available, four of which are zero speed ratios.

Reversal of the direction of travel is effected by reversing the direction of rotation of the motor 12. In order to change speed ratio it is necessary to interrupt drive to the transmission 5 and this is effected by interrupting the flow of fluid from the pump 11 to the motor 12.

Operation of the change speed mechanism will now be described.

Figures 4, 8:
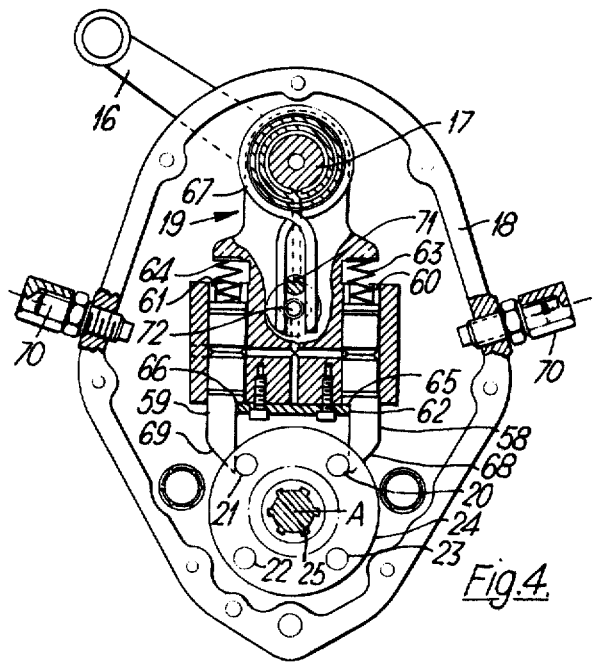
FIG. 4 is a view in the direction of arrow IV in FIG. 3.
FIG. 8 is a chart showing the condition of the transmission corresponding to each of the positions shown in FIG. 7.

It is assumed that excavator 1 is stationary, that is, the transmission is in a zero speed ratio condition, and the indexing mechanism 19 is in the position shown in FIG. 4 which corresponds to the preferred position of the lever 13. In order to select a drive condition it is first necessary to interrupt the drive to the motor 12 as previously described. Lever 13 is then moved vertically, for example downwards, which causes the rod 15 to move vertically upwards and thereby rotates the lever 16 and the indexing mechanism 19 in a clockwise direction. Stepped plungers 58, 59 are retained in the blind bores 60, 61 by a plate 62 which co-operates with the steps 65, 66. The plungers 58, 59 are biased towards the plate 62 by the springs 63, 64. The ends of the plungers 58, 59 are provided with ramps 68, 69, the function of which will be described later. As the indexing mechanism 19 rotates, the plunger 58 co-operates with the pin 20 to rotate the member 24, and therefore the shaft 25, in an anticlockwise direction. At the same time the plunger 59 moves away from the pin 21 to allow the pin 21 to move freely past it.

Angular movement of the indexing mechanism 19 is restricted by the stops 70 which are adjusted so that each complete angular movement of the indexing mechanism produces a 90° rotation of the shaft 25.

A coil spring 67 is provided to return the indexing mechanism 19 to the position shown in FIG. 3 when the lever 13 is released. A first stop 71, fixed to the housing 18, co-operates with one end of the spring 67 to prevent the spring from rotating and a second stop 72, fixed to the indexing mechanism 19, moves the other end of the spring 67 as the indexing mechanism 19 rotates, thereby stressing the spring 67. When the lever 13 is released the spring 67 returns the indexing mechanism 19 to its original position and the lever 13 to the preferred position.

As the indexing mechanism 19 returns, the pin 23, which is now in the position originally occupied by the pin 20, engages the ramp 68 and moves the plunger 58 along the bore 60 against the spring 63. When the plunger 58 has cleared the pin 23 the spring 63 returns the plunger 58 to abut the plate 62. The mechanism 19 is then ready for further indexing.

It will be evident that if the lever 13 were moved upwards the indexing mechanism 19 would operate in a manner similar to that described above to rotate the shaft 25 in a clockwise direction.

As the shaft 25 rotates the cam followers 30, 31 follow the axial deviation of the cam tracks, 29, 28 and thereby axially move the selector forms 32, 33 and the clutches 34, 35. Rotation of the selector forks 32, 33 with the shaft 25 is prevented by the co-operation between the clutches 34, 35 and the selector forms 32, 33.

Figure 6:
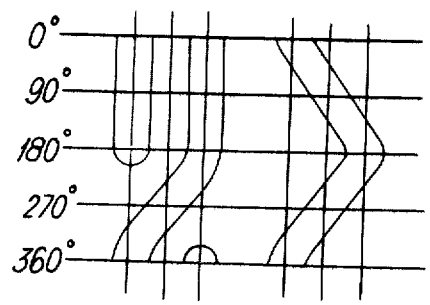
FIG. 6 is a development of the surface of the shaft as shown in FIG. 5, developed from a hypothetical cut made at A in FIG. 4.
Figure 7:
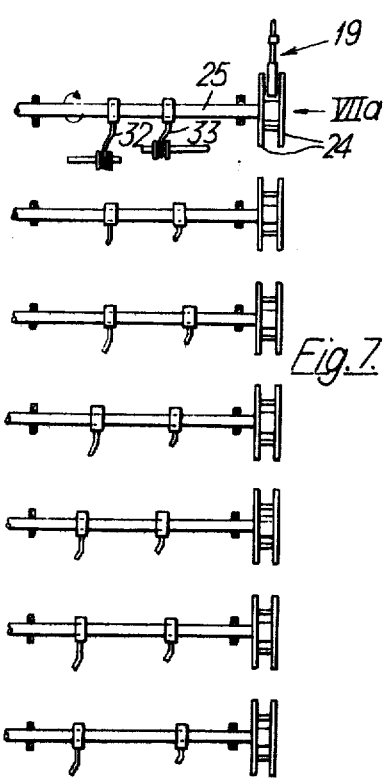
FIG. 7 is a diagrammatic representation of the positions occupied by the selector mechanism of the change speed transmission.
Figure 7A:
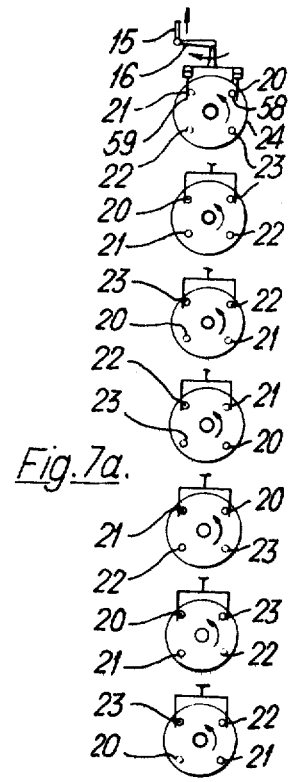
FIG. 7a is a view in the direction of arrow VIIa in FIG. VII.

As is best seen in FIGS. 6, 7 and 8 the cam tracks 28, 29 are chosen with zigzag pattern so that each 90° rotation of the shaft 25 moves one or both of the clutches 34, 35 into or out of engagement with their respective gear wheels. One of the cam tracks 29, has a linear and curved portion interconnecting two substantially parallel linear portions as best illustrated in FIG. 6. A seven speed ratio transmission is provided in which alternate ratios are zero speed ratios. Therefore with the vehicle 1 in a zero speed ratio the operator merely moves the lever 13 in either direction from the preferred position to engage a positive speed ratio and similarly, further movement of the lever 13 in either direction returns the transmission to a zero speed condition.

What we claim is:

1. A change speed transmission providing a finite plurality of speed ratios, said transmission comprising drive means adapted to drivingly engage said speed ratios, a rotatable shaft with a surface, said drive means slidable on said shaft, cam means including two cam tracks on the surface of said shaft between said shaft and said drive means to engage selectively said drive means, indexing means operable and mounted on said shaft to move said cam means, one of said cam tracks comprising a zigzag form and the other of said cam tracks comprising two substantially parallel linear portions interconnected by a linear and curved portion, and in which a first drive means is associated with said one cam track and a second drive means is associated with said other cam track, the arrangement being such that rotation of said shaft firstly axially moves said first drive means in a first axial direction and maintains said second drive means axially stationary, secondly reverses the direction of movement of said first drive means and, moves said second drive means in an axial direction, and thirdly moves said first drive means axially in said first direction and maintains said second drive means axially stationary, and a manually operable control for indexing movement of said indexing means by successive movement for selection of alternate ratios which are zero speed ratios.

2. A change speed transmission providing a finite plurality of speed ratios, said transmission comprising drive means adapted to drivingly engage said speed ratios, a rotatable shaft with a surface, said drive means slidable on said shaft, cam means including two cam tracks on the surface of said shaft between said shaft and said drive means to engage selectively said drive means, indexing means operable and mounted on said shaft to move said cam means, and a manually operable control for indexing movement of said indexing means by successive movement for selection of alternate ratios which are zero speed ratios, said indexing means comprising at least one indexing element rotatable about an axis by movement of said control, said element in turn cooperating with a plurality of projections provided on said shaft to effect rotation thereof, said indexing element mounted for axial movement within a housing and resiliently biased in an axial direction, said member being fixedly attached to a lever for rotation therewith about a fixed axis.

3. The change speed transmission of claim 2 in which at least said one indexing element is provided with a ramp for one way movement past said projections.

4. The change speed transmission of claim 2, in which said projections are pins located substantially parallel to the axis of said shaft and held between spaced discs, said discs being substantially concentric with said shaft and fixedly attached thereto.

* * * * *